(12) United States Patent
Talyansky et al.

(10) Patent No.: US 9,022,289 B1
(45) Date of Patent: May 5, 2015

(54) PRODUCT AUTHENTICATOR AND BARCODE SCANNER INTERLOCK

(71) Applicants: Vitaly Talyansky, Portland, OR (US); Edward Talyansky, Battle Ground, WA (US); Jason Moore, Vancouver, WA (US)

(72) Inventors: Vitaly Talyansky, Portland, OR (US); Edward Talyansky, Battle Ground, WA (US); Jason Moore, Vancouver, WA (US)

(73) Assignee: Stardust Materials, LLC, Vancouver, WA (US)

( * ) Notice: Subject to any disclaimer, the term of this patent is extended or adjusted under 35 U.S.C. 154(b) by 0 days.

(21) Appl. No.: 14/151,697

(22) Filed: Jan. 9, 2014

(51) Int. Cl.
*G06K 7/10* (2006.01)

(52) U.S. Cl.
CPC .................................. *G06K 7/10821* (2013.01)

(58) Field of Classification Search
USPC ............ 235/462.01, 462.1, 462.09, 375, 487
See application file for complete search history.

(56) References Cited

U.S. PATENT DOCUMENTS

| | | | |
|---|---|---|---|
| 7,995,196 B1* | 8/2011 | Fraser | 356/71 |
| 2003/0141358 A1* | 7/2003 | Hudson et al. | 235/375 |
| 2007/0241177 A1* | 10/2007 | Tuschel et al. | 235/375 |
| 2009/0001164 A1* | 1/2009 | Brock et al. | 235/462.01 |
| 2009/0051485 A1* | 2/2009 | Corry et al. | 340/5.8 |
| 2014/0151445 A1* | 6/2014 | Pawlik et al. | 235/375 |

\* cited by examiner

*Primary Examiner* — Edwyn Labaze

(57) ABSTRACT

Methods and apparatus for a product authenticator and barcode scanner interlock. An example apparatus includes a barcode scanner to scan a barcode on an item and a tester to determine whether the item is authentic, wherein the tester prevents the barcode from scanning the item if the item is not authentic.

17 Claims, 4 Drawing Sheets

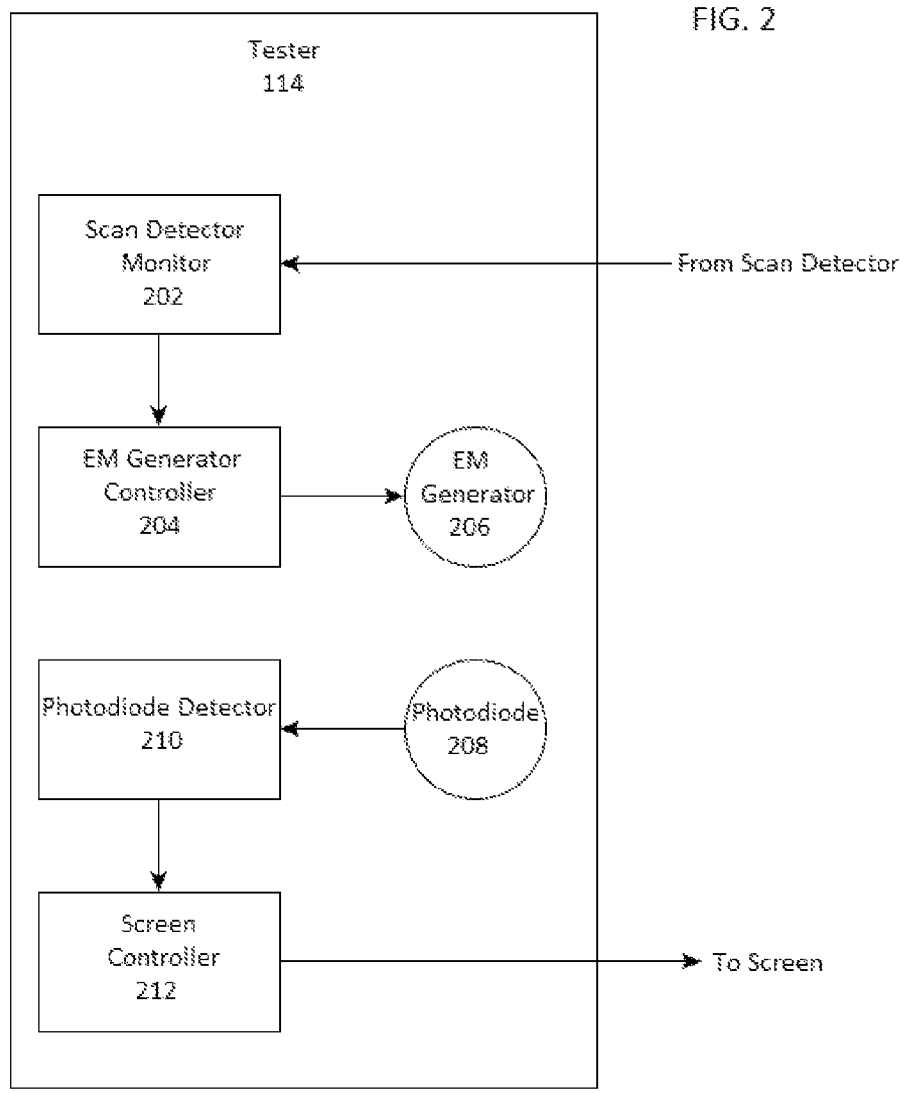

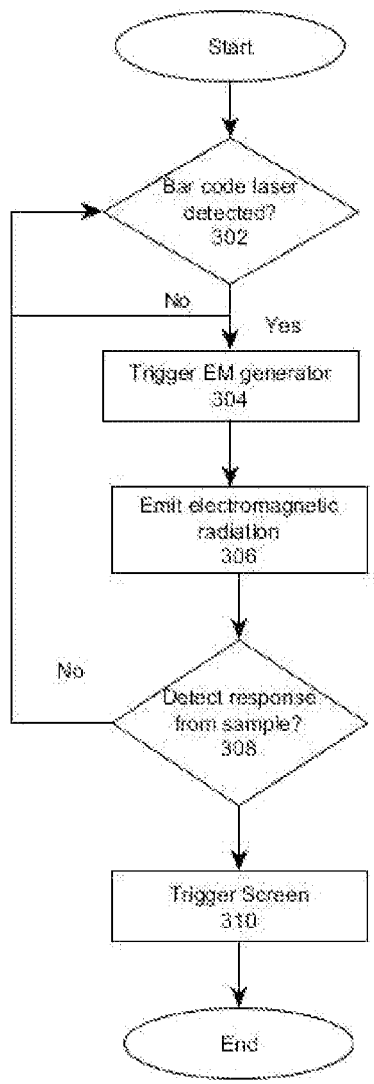

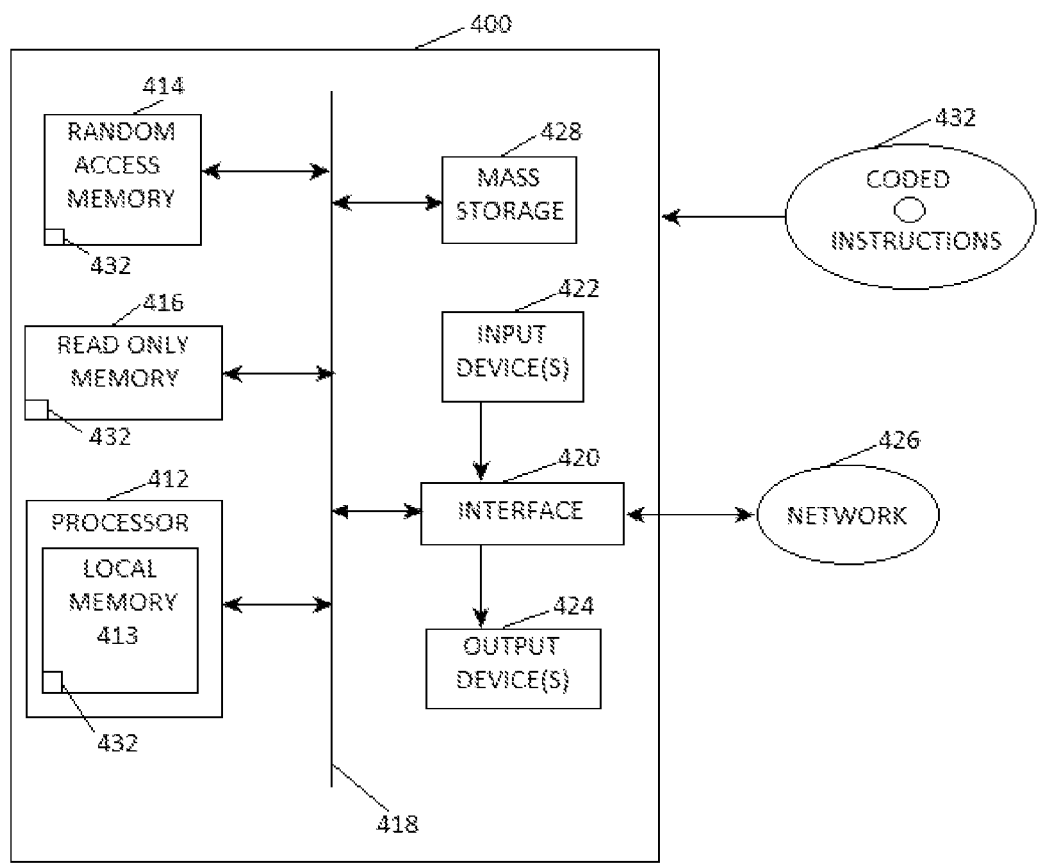

PRODUCT AUTHENTICATOR AND
BARCODE SCANNER INTERLOCK

FIELD OF THE DISCLOSURE

The present disclosure relates generally to product authentication and, more particularly, to a product authenticator and barcode scanner interlock.

BACKGROUND

Barcodes are often used on the labeling and/or packaging of products to identify and/or provide information about the products. A barcode scanner scans a barcode on a product to extract the information contained in the barcode. A barcode can be illegally copied and placed on a counterfeit product to create a counterfeit product that appears authentic.

BRIEF DESCRIPTION OF THE DRAWINGS

FIG. 2 is a block diagram of the example tester of FIG. 1.

FIG. 3 is a flowchart representative of example machine readable instructions that may be executed to implement the example tester of FIG. 2.

FIG. 4 is a block diagram of an example processing system capable of executing the example machine readable instructions of FIG. 3 to implement the example tester of FIG. 2.

DETAILED DESCRIPTION

Figure 1:
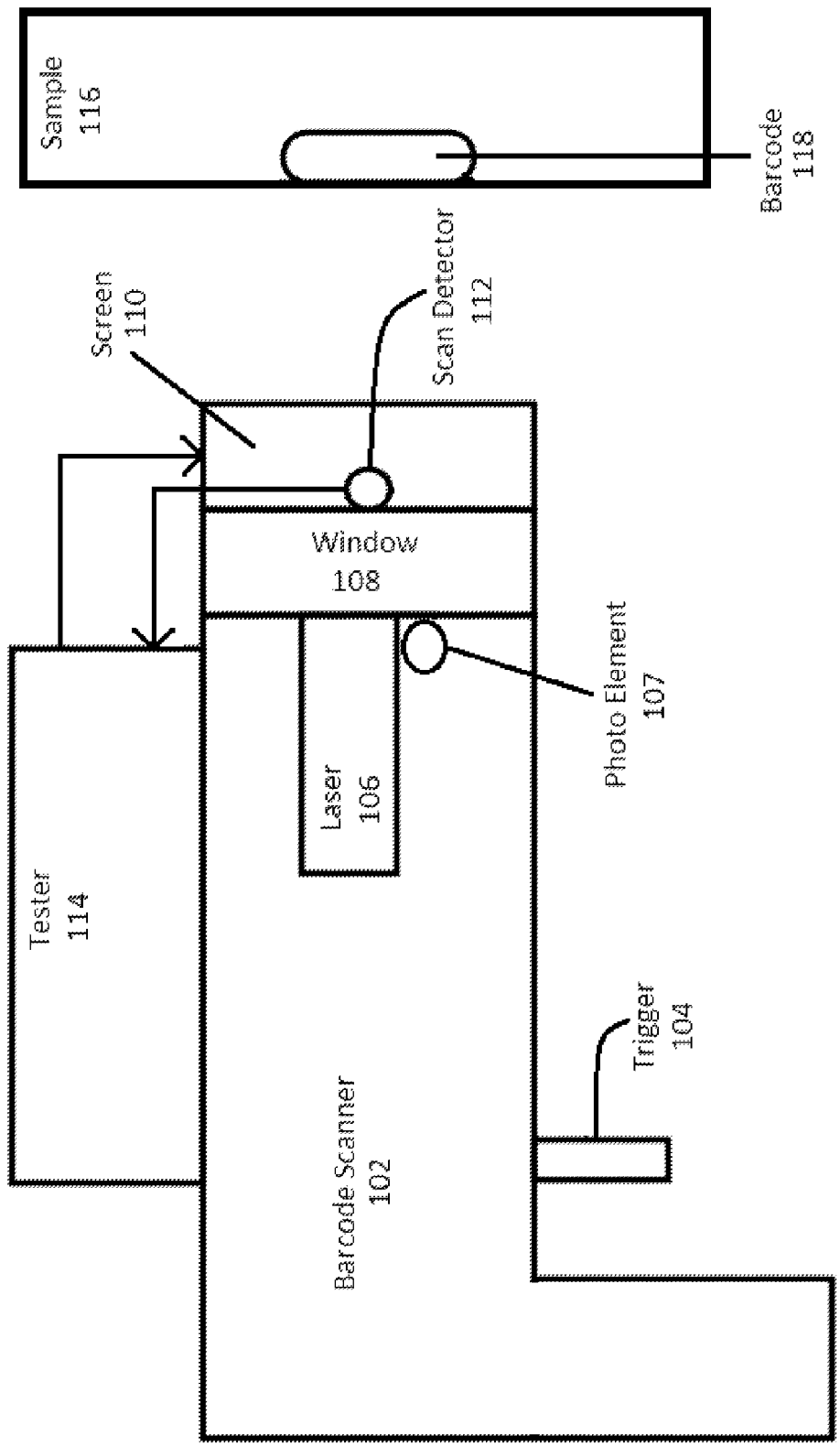
FIG. 1 is a block diagram of an example product authenticator and barcode scanner interlock constructed in accordance with the teachings of this disclosure.

A barcode is a machine readable representation of data placed on a label, packaging and/or directly on an item or product. A barcode is typically a series of lines, dots and/or other geometric shapes and spaces that can be read by a laser or other optical scanning device (i.e., a barcode scanner). When a barcode scanner scans a barcode, the barcode scanner decodes the information in the barcode. The information in the barcode represents data about the product that the barcode is affixed to, such as the type of item, the model of the item, the price of the item, etc. This decoded information is then used to record the product in inventory, display the price of the item, or any other purpose desired by a user.

Standard barcodes are optically scanned by a barcode scanner, and as such the barcodes are visible. Therefore, they can be easily copied. A copied barcode can be placed on a counterfeit product to make the counterfeit product appear authentic. If such a counterfeit product with a copied barcode is scanned by a barcode scanner, the barcode scanner will not be able to determine that the product is a counterfeit. Counterfeit products can cause significant economic and other damage to both the purveyor of authentic non-counterfeit products and the consumer of those counterfeit products.

Luminescence is a response of certain optical materials to electromagnetic radiation. More specifically, a luminescent material that is hit with electromagnetic radiation at a certain frequency will emit electromagnetic radiation in response at a different frequency. By embedding a controlled luminescent material in a product, the product can later be tested for authenticity by hitting the product with electromagnetic radiation at a particular frequency and testing for a corresponding luminescent response. A counterfeit product that does not have the luminescent material will not produce the luminescent response. Furthermore, the embedded luminescent material can be invisible to the naked eye. Using such a luminescent material as a security feature in a product will make the product very difficult to counterfeit. By combining a luminescent material on a product with a barcode, the product can be both authenticated and have its barcode scanned with a single device as described herein.

Example methods, apparatus, and/or articles of manufacture disclosed herein provide a product authenticator and barcode scanner interlock. In particular, examples disclosed herein provide a mechanism for authenticating a product and allowing a barcode corresponding to the product to be scanned only if the product is authenticated successfully.

In examples disclosed herein, a tester is attached to and electronically interlocked with a barcode scanner. In examples disclosed herein, when the barcode scanner is pointed at a barcode on a product and activated, the tester emits light (e.g., visible light, infrared light, ultra-violet light) onto the product and/or the barcode. In examples disclosed herein, authentic products contain embedded optical materials with a luminescent response (i.e. taggant). In examples disclosed herein, when the light emitted by the tester hits the product, the taggant in the product causes a luminescent response, which is subsequently detected by the tester. In examples disclosed herein, when the luminescent response is detected by the tester, the tester allows the barcode scanner to operate normally and scan the barcode on the product. If the tester does not detect an appropriate luminescent response, the tester does not allow the barcode scanner to scan the barcode on the product. This prevents the barcode scanner from scanning a counterfeit or non-authentic product.

FIG. 1 is a block diagram of an example product authenticator and barcode scanner interlock constructed in accordance with the teachings of this disclosure. The example of FIG. 1 includes a barcode scanner 102, a tester 114, a screen 110 and a sample 116. The example barcode scanner 102 of FIG. 1 includes a trigger 104, a laser 106, a photo element 107 and a window 108. The example screen 110 of FIG. 1 includes a scan detector 112. The example sample 116 of FIG. 1 includes a barcode 118.

In the illustrated example, the barcode scanner 102 is a standard commercially available barcode scanner. The example barcode scanner 102 optically scans a barcode and decodes the information in the barcode. Any type of barcode scanner capable of optically scanning barcodes may be used.

In the illustrated example, the barcode scanner 102 contains a manual trigger 104. The example trigger 104 causes the example barcode scanner 102 to begin scanning a barcode. Alternatively, any other method of causing the barcode scanner to begin scanning a barcode may be used.

In the illustrated example, the barcode scanner 102 contains a laser 106 and a photo element 107. The example laser 106 projects laser light through the example window 108 onto the example barcode 118. The light from the example laser 106 is then reflected off of the example barcode 118 back through the example window 108 and the reflected light is detected by the example photo element 107. In the illustrated example, the photo element 107 is a photodiode. In other examples, the photo element 107 may be a camera or other device capable of measuring reflected light from the barcode 118. In some examples, the laser 106 may be replaced with a different type of light source (e.g., an LED array) that projects light onto the barcode 118 whose reflection can be measured by the photo element 107.

In the illustrated example, the tester 114 is placed on top of the barcode scanner 102 and is then affixed to the barcode scanner 102. The example tester 114 can be affixed to the example barcode scanner 102 by tape, glue, wires, straps, welding or any other method. In some examples, the tester 114 can be removed from the barcode scanner 102. In other examples, the tester 114 is permanently attached to the barcode scanner 102. In other examples, the tester 114 and the barcode scanner 102 are a single device. The example tester 114 is discussed further in connection with FIG. 2.

In the illustrated example, the screen 110 is placed in front of the window 108. When the example tester 114 determines that the example sample 116 is authentic, the example screen 110 allows the light from the example laser 106 to pass through the screen 110 and onto the example barcode 118 and back through the screen 110 and onto the example photo element 107, thus allowing the example barcode scanner 102 to scan the barcode 118 on the authentic sample 116. However, when the example tester 114 determines that the example sample 116 is not authentic, the example screen 110 blocks the light from the example laser 106 and thereby prevents the barcode scanner 102 from scanning the barcode 118 on the counterfeit sample 116. In the illustrated example, the screen 110 covers both the laser 106 and the photo element 107. In some examples, the screen 110 blocks the laser 106 but not the photo element 107. In other examples, the screen 110 blocks the photo element 107 but not the laser 106.

In the illustrated example, the screen 110 is a polymer strip that is opaque when no voltage is applied to it and transparent when an appropriate voltage is applied to it. In the illustrated example, the screen 110 (i.e., the polymer strip) is placed on the window 108 such that the light from the laser 106 must pass through the screen 110 in order to reach the sample 116 and to reflect back to the photo element 107. In the illustrated example, the screen 110 is connected to the tester 114 and the tester 114 applies a voltage to the screen 110 when the tester 114 determines that the sample 116 is authentic. Alternatively, any other type of screen 110 that allows light from the laser 106 and the reflection off of the barcode 118 to pass through it only when the tester 114 determines that the sample 116 is authentic may be used.

In the illustrated example, the screen 110 contains a scan detector 112. The example scan detector 112 detects when the example barcode scanner 102 begins scanning the example barcode 118 (e.g., when the example trigger 104 is pulled). In the illustrated example, the scan detector 112 is a photodiode that detects the light emitted by the laser 106. Alternatively, any other scan detector 112 capable of determining when the barcode scanner 102 begins scanning the barcode 118 may be used. In the illustrated example, the scan detector 112 is connected to the tester 114. In the illustrated example, when the scan detector 112 detects light from the laser 106, the scan detector 112 sends a signal to the tester 114. This allows the example tester 114 to remain in a low power mode when the example barcode scanner 102 is not in use, thus conserving battery life. In some examples, the scan detector 112 is omitted from FIG. 1. In these examples, the tester 114 is always in operation.

In the illustrated example, the sample 116 is the item or product that is to be authenticated. The example sample 116 contains the example barcode 118. The example sample 116 is authenticated by the example tester 114. In the illustrated example, the sample 116 contains taggant, which is a material that has a luminescent response such that when light or other electromagnetic radiation at a certain frequency hits the sample 116, the taggant in the sample 116 emits light or other electromagnetic radiation at a different frequency. In the illustrated example, the luminescent response produced by the taggant in the sample 116 is invisible to the naked eye and only detectable by the tester 114. In the illustrated example, if no taggant is present in the sample 116, then the sample 116 is not authentic and it does not produce a luminescent response. In the illustrated example, the taggant material is blended into ink that is printed on the labeling for the sample 116, the packaging of the sample 116 and/or the sample 116 itself. In other examples, taggant material can be introduced into the barcode 118. In some examples, taggant material can be introduced into the sample 116 through impregnating paper or plastic substrate, coating the sample 116 and/or other methods. In some examples, optical taggant material is not used at all and the sample 116 responds to the tester 114 by responding to a changing electric field, responding to a changing magnetic field and/or other methods.

In the illustrated example, the barcode 118 is a standard one-dimensional or two-dimensional barcode (e.g., UPC, PostNet, EAN, QR, PDF 417, etc.). In other examples, any type of barcode that encodes information about the sample 116 that can be optically scanned by the barcode scanner 102 may be used.

FIG. 2 is a block diagram of the example tester 114 of FIG. 1. The example tester 114 of FIG. 2 includes a scan detector monitor 202, an EM generator controller 204, an EM generator 206, a photodiode 208, a photodiode detector 210 and a screen controller 212.

In the illustrated example, the scan detector monitor 202 monitors and communicates with the scan detector 112 to determine when the barcode scanner 102 begins scanning for the barcode 118. The example scan detector 112 sends a signal to the example scan detector monitor 202 when the example barcode scanner 102 begins scanning for the example barcode 118. When the example scan detector monitor 202 receives such a signal, the example scan detector monitor 202 sends a signal to the example EM generator controller 204.

In the illustrated example, the EM generator controller 204 controls the EM generator 206. The example EM generator controller 204 communicates with the example scan detector monitor 202 to receive a signal indicating that the example barcode scanner 102 has begun scanning for the example barcode 118. The example EM generator controller 204 communicates with and controls the operation of the example EM generator 206. The example EM generator controller 204 turns the example EM generator 206 on and off.

The example EM generator 206 generates electromagnetic radiation. In the illustrated example, the EM generator 206 generates infrared light that creates a luminescent response in the taggant in the sample 116. In other examples, the EM generator 206 may generate visible light or ultraviolet light or radiation from any other portions of the electromagnetic spectrum. The radiation generated by the example EM generator 206 is projected onto the sample 116. In the illustrated example, the EM generator 206 generates infrared radiation at a frequency that creates a luminescent response in the taggant in the sample 116. In other examples, the EM generator 206 may generate radiation at other frequencies.

In the illustrated example, the photodiode 208 detects a luminescent response from the sample 116. The example photodiode 208 detects the radiation that is emitted by the example sample 116 after the sample 116 is excited by the example EM generator 206. The example photodiode 208 communicates with the example photodiode detector 210.

In the illustrated example, the photodiode detector 210 communicates with the photodiode 208 to detect when the photodiode 208 receives a luminescent response from the sample 116. The example photodiode detector 210 communicates with the example screen controller 212.

In the illustrated example, the screen controller 212 communicates with and controls the screen 110. The example screen controller 212 controls when the screen 110 is opaque, blocking transmission of light from the example laser 106 and when the screen 110 is transparent, allowing transmission of light from the example laser 106. In the illustrated example, the screen controller 212 applies a voltage to the polymer strip screen 110, which changes the screen 110 it from opaque to transparent.

While an example manner of implementing the product authenticator and barcode scanner interlock has been illustrated in FIGS. 1 and 2, one or more of the elements, processes and/or devices illustrated in FIG. 1 and/or FIG. 2 may be combined, divided, re-arranged, omitted, eliminated and/or implemented in any other way. Further, the example barcode scanner 102, the example trigger 104, the example laser 106, the example photo element 107, the example window 108, the example screen 110, the example scan detector 112, the example tester 114, the example sample 116, the example barcode 118, the example scan detector monitor 202, the example EM generator controller 204, the example EM generator 206, the example photodiode detector 210, the example screen controller 212 and/or, more generally, the example product authenticator and barcode scanner interlock of FIG. 1 may be implemented by hardware, software, firmware and/or any combination of hardware, software and/or firmware. Thus, for example, any of the example barcode scanner 102, the example trigger 104, the example laser 106, the example photo element 107, the example window 108, the example screen 110, the example scan detector 112, the example tester 114, the example sample 116, the example barcode 118, the example scan detector monitor 202, the example EM generator controller 204, the example EM generator 206, the example photodiode detector 210, the example screen controller 212 and/or, more generally, the example product authenticator and barcode scanner interlock of FIG. 1 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example barcode scanner 102, the example trigger 104, the example laser 106, the example photo element 107, the example window 108, the example screen 110, the example scan detector 112, the example tester 114, the example sample 116, the example barcode 118, the example scan detector monitor 202, the example EM generator controller 204, the example EM generator 206, the example photodiode detector 210, the example screen controller 212 and/or, more generally, the example product authenticator and barcode scanner interlock of FIG. 1 is hereby expressly defined to include a tangible computer readable storage medium such as a memory, DVD, CD, Blu-ray, etc. storing the software and/or firmware. Further still, the example barcode scanner 102, the example trigger 104, the example laser 106, the example photo element 107, the example window 108, the example screen 110, the example scan detector 112, the example tester 114, the example sample 116, the example barcode 118, the example scan detector monitor 202, the example EM generator controller 204, the example EM generator 206, the example photodiode detector 210, the example screen controller 212 and/or, more generally, the example product authenticator and barcode scanner interlock of FIG. 1 may include more than one of any or all of the illustrated elements, processes and devices.

FIG. 3 is a flowchart representative of example machine readable instructions for implementing the example product authenticator and barcode scanner interlock of FIG. 1 and/or FIG. 2. In the example flowchart of FIG. 3, the machine readable instructions comprise program(s) for execution by a processor such as the processor 412 shown in the example computer 400 discussed below in connection with FIG. 4. The program(s) may be embodied in software stored on a tangible computer readable storage medium such as a CD-ROM, a floppy disk, a flash drive, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program(s) is described with reference to the flowcharts illustrated in FIG. 3, many other methods of implementing the example product authenticator and barcode scanner interlock of FIG. 1 and/or FIG. 2 may alternatively be used. For example, the order of execution of the blocks may be changed, and/or some of the blocks described may be changed, eliminated, or combined.

As mentioned above, the example processes of FIG. 3 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIG. 3 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 3 begins when the example scan detector monitor 202 determines if the example scan detector 112 has detected that the example barcode scanner 102 has begun scanning for the example barcode 118 (block 302). If the example scan detector monitor 202 determines that the example barcode scanner 102 has not begun scanning for the example barcode 118 (block 302), then control returns to block 302. If the example scan detector monitor 202 determines that the example barcode scanner 102 has begun scanning for the example barcode 118 (block 302), then the scan detector monitor 202 sends a signal to the example EM generator controller 204 and control passes to block 304.

After the example EM generator controller 204 receives a signal from the example scan detector monitor 202 (block 302), the EM generator controller 204 triggers the EM generator 206 to begin emitting electromagnetic radiation (block 304). In the illustrated example, the EM generator controller 204 triggers the EM generator 206 to generate a series of short pulses of radiation. In other examples, the EM generator controller 204 may trigger the EM generator 206 to generate pulses of radiation of any length, in any periodic or aperiodic intervals or continuously.

After the example EM generator controller 204 triggers the example EM generator 206 (block 304), the EM generator 206 emits electromagnetic radiation as controlled by the EM generator controller 204 (block 306). In the illustrated example, the EM generator 206 generates radiation in the infrared portion of the electromagnetic spectrum. Alternatively, the EM generator 206 may generate radiation in any other portions of the electromagnetic spectrum.

After the example EM generator 206 emits electromagnetic radiation (block 306), the example photodiode detector 210 determines whether the example photodiode 208 detects a response from the example sample 116. If the example photodiode 208 does not detect a response from the example sample 116 (block 308), control returns to block 302. If the example photodiode 208 detects a response from the example sample 116 (block 308), the example photodiode detector 210 sends a signal to the example screen controller 212 and control passes to block 310.

After the example screen controller 212 receives a signal from the example photodiode detector 210, the example screen controller 212 triggers the example screen 110 to change from opaque to transparent, thereby allowing light from the example laser 106 in the example barcode scanner 102 to pass through the screen 110 and reach the example sample 116 (block 310). In the illustrated example, the screen 110 is a polymer strip and the screen controller 212 triggers the screen 110 by applying a voltage to it. In other examples, the screen 110 may be of any other type and/or material that allows light from the laser 106 to reach the sample 116 only after the screen 110 is triggered by the screen controller 212. After the example screen controller 212 triggers the example screen 110, the example of FIG. 3 ends.

FIG. 4 is a block diagram of a processor platform 400 capable of executing the instructions of FIG. 3 to implement the example product authenticator and barcode scanner interlock of FIGS. 1 and 2. The processor platform 400 can be, for example, a server, a personal computer, an Internet appliance, a DVD player, a CD player, a Blu-ray player, a gaming console, a personal video recorder, a smart phone, a tablet, a printer, or any other type of computing device.

The processor platform 400 of the instant example includes a processor 412. As used herein, the term "processor" refers to a logic circuit capable of executing machine readable instructions. For example, the processor 412 can be implemented by one or more microprocessors or controllers from any desired family or manufacturer.

The processor 412 includes a local memory 413 (e.g., a cache) and is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 also includes an interface circuit 420. The interface circuit 420 may be implemented by any type of interface standard, such as an Ethernet interface, a universal serial bus (USB), and/or a PCI express interface.

One or more input devices 422 are connected to the interface circuit 420. The input device(s) 422 permit a user to enter data and commands into the processor 412. The input device (s) can be implemented by, for example, a keyboard, a mouse, a touchscreen, a track-pad, a trackball, isopoint and/or a voice recognition system.

One or more output devices 424 are also connected to the interface circuit 420. The output devices 424 can be implemented, for example, by display devices (e.g., a liquid crystal display, a cathode ray tube display (CRT), a printer and/or speakers). The interface circuit 420, thus, typically includes a graphics driver card.

The interface circuit 420 also includes a communication device such as a modem or network interface card to facilitate exchange of data with external computers via a network 426 (e.g., an Ethernet connection, a digital subscriber line (DSL), a telephone line, coaxial cable, a cellular telephone system, etc.).

The processor platform 400 also includes one or more mass storage devices 428 for storing software and data. Examples of such mass storage devices 428 include floppy disk drives, hard drive disks, compact disk drives and digital versatile disk (DVD) drives.

The coded instructions 432 of FIG. 4 may be stored in the mass storage device 428, in the volatile memory 414, in the non-volatile memory 416, and/or on a removable storage medium such as a CD or DVD.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. An apparatus comprising:
   a barcode scanner to scan a barcode on an item; and
   a tester to determine whether the item is authentic, wherein the tester prevents the barcode from scanning the item if the item is not authentic, the tester comprising:
   an EM generator to emit electromagnetic radiation onto the item;
   a photodiode to detect electromagnetic radiation emitted by the item, the tester to determine that the item is authentic when the photodiode detects electromagnetic radiation at a first frequency; and
   a screen to block light from the barcode scanner when the tester determines that the item is not authentic.

2. The apparatus of claim 1, wherein the EM generator is a light emitting diode.

3. The apparatus of claim 2, wherein the light emitting diode emits infrared light.

4. The apparatus of claim 1, wherein the screen is a polymer strip that is opaque when no voltage is applied to it, and that is transparent when a voltage is applied to it.

5. The apparatus of claim 1, wherein the item has a luminescent response to the electromagnetic radiation emitted by the EM generator.

6. The apparatus of claim 1, wherein the item contains taggant that has a luminescent response to the electromagnetic radiation emitted by the EM generator.

7. The apparatus of claim 1, further comprising a scan detector monitor to determine whether the barcode scanner is scanning an item, wherein the tester determines whether the item is authentic only when the scan detector determines that the barcode scanner is scanning an item.

8. A method comprising:
   determining whether an item is authentic;
   scanning a barcode on the item if the item is authentic;
   emitting electromagnetic radiation onto the item;

detecting electromagnetic radiation emitted by the item, a tester to determine that the item is authentic when a photodiode detects electromagnetic radiation at a first frequency; and blocking light from a barcode scanner when the tester determines that the item is not authentic.

9. The method of claim 8, wherein blocking the light from a barcode scanner comprises:

applying a voltage to a polymer strip over the window of the barcode scanner, the polymer strip being opaque when no voltage is applied to it and transparent when a voltage is applied to it.

10. The method of claim 8, wherein the item contains taggant that has a luminescent response to the electromagnetic radiation emitted by the EM generator.

11. The method of claim 8, wherein the electromagnetic radiation emitted onto the item is infrared light.

12. The method of claim 8, further comprising determining whether the barcode scanner is scanning an item and determining whether the item is authentic only when it is determined that the barcode scanner is scanning an item.

13. A non-transitory tangible machine readable storage medium comprising instructions that, when executed, cause a machine to at least:

determine whether an item is authentic;

scan a barcode on the item if the item is authentic;

emit electromagnetic radiation onto the item;

detect electromagnetic radiation from the item, a tester to determine that the item is authentic when a photodiode detects electromagnetic radiation at a first frequency; and block light from a barcode scanner when the tester determines that the item is not authentic.

14. The storage medium of claim 13, wherein the instructions, when executed, cause the machine to apply a voltage to a polymer strip over the window of the barcode scanner, the polymer strip being opaque when no voltage is applied to it and transparent when a voltage is applied to it.

15. The storage medium of claim 13, wherein the item contains taggant that has a luminescent response to the electromagnetic radiation emitted by the EM generator.

16. The storage medium of claim 13, wherein the electromagnetic radiation emitted onto the item is infrared light.

17. The storage medium of claim 13, wherein the instructions, when executed, cause the machine to determine whether the barcode scanner is scanning an item and determine whether the item is authentic only when it is determined that the barcode scanner is scanning an item.

\* \* \* \* \*